United States Patent [19]
Raasakka

[11] Patent Number: 5,581,447
[45] Date of Patent: Dec. 3, 1996

[54] SOLAR SKYLIGHT APPARATUS

[76] Inventor: Benny O. Raasakka, 527 Harvard Pl., Apopka, Fla. 32703

[21] Appl. No.: 394,775

[22] Filed: Feb. 27, 1995

[51] Int. Cl.⁶ ..................................... F21V 7/04
[52] U.S. Cl. ............................ 362/32; 126/700; 126/698
[58] Field of Search ......................... 362/32; 126/698–700

[56] References Cited

U.S. PATENT DOCUMENTS

| | | | |
|---|---|---|---|
| 3,314,331 | 4/1967 | Wiley . | |
| 4,297,000 | 10/1981 | Fries | 362/32 |
| 4,411,490 | 10/1983 | Daniel | 362/32 |
| 4,589,400 | 5/1986 | Mori | 126/700 |
| 4,928,666 | 5/1990 | Mori et al. | 126/698 |
| 5,278,731 | 1/1994 | Davenport et al. | 362/32 |

*Primary Examiner*—Carroll B. Dority
*Attorney, Agent, or Firm*—William M. Hobby, III

[57] ABSTRACT

A solar skylight is provided for collecting sunlight and dispersing the light within a building without the necessity for any roof penetrations of the building. The solar collector includes a base having a fixed portion and a rotatable portion and having a movable housing mounted to the rotatable portion of the base so that the solar collector housing can be rotated and moved up and down to aim the collector face towards the sun. A transparent cover that absorbs ultraviolet light and reflects infrared light is mounted over the front of the housing. A plurality of solar collectors are supported in a frame within the housing and aimed at the transparent cover for collecting solar energy passing therethrough. Each solar collector has a fresnel lens mounted on a mirrored, funnel shaped collector coupled to fiber optic cables for receiving the light collected by the solar collector. The fiber optic cables are combined into a bundle consisting of smaller bundled cables from each of the solar collectors and then passed through the collector housing and through a building transition for connection to a light dispersion unit. A light dispersion unit includes a light reflective interior built into the housing and a prismatic cover for dispersing light within a room in a building.

5 Claims, 1 Drawing Sheet

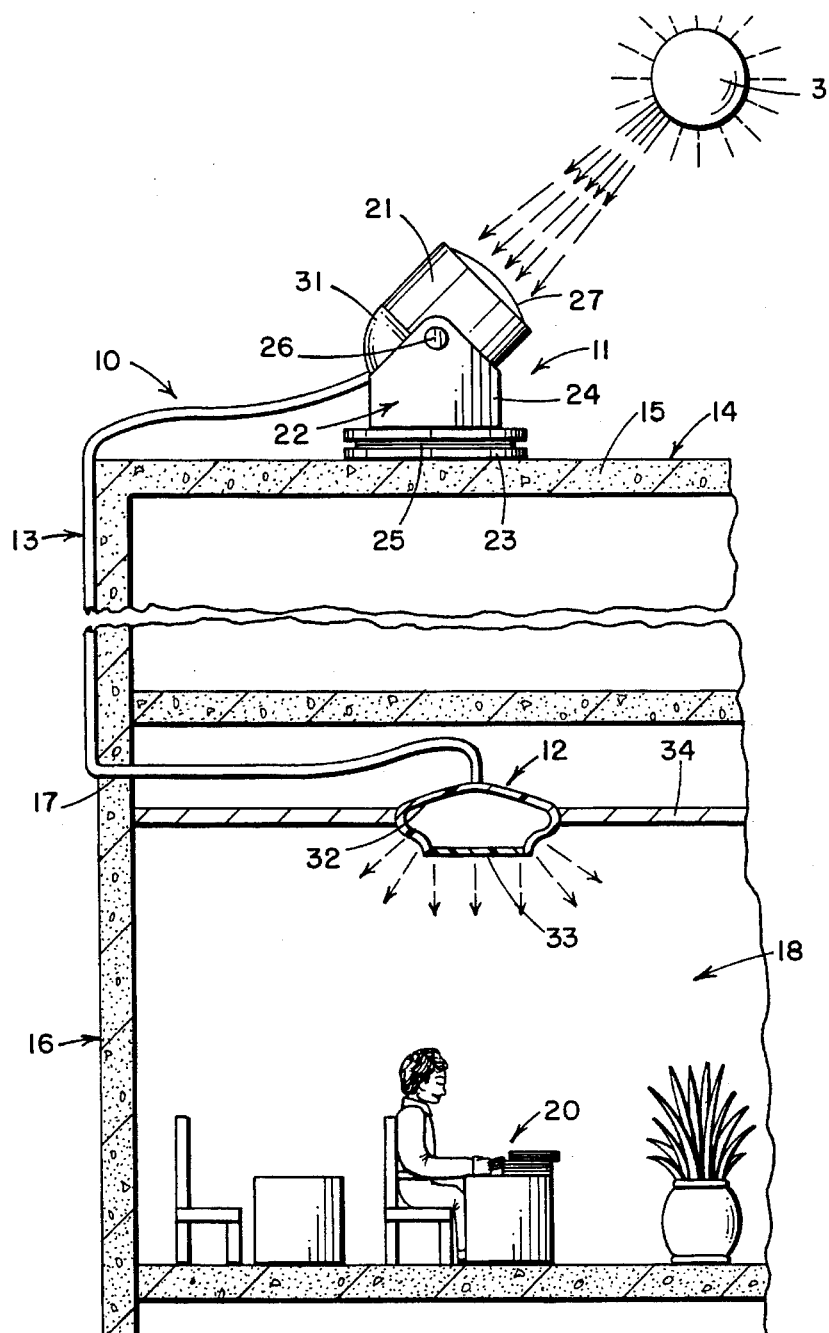
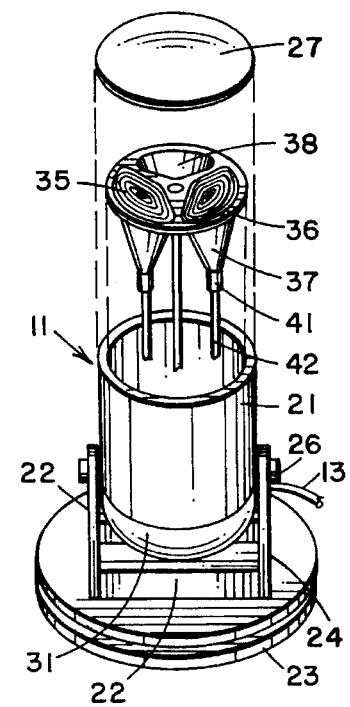
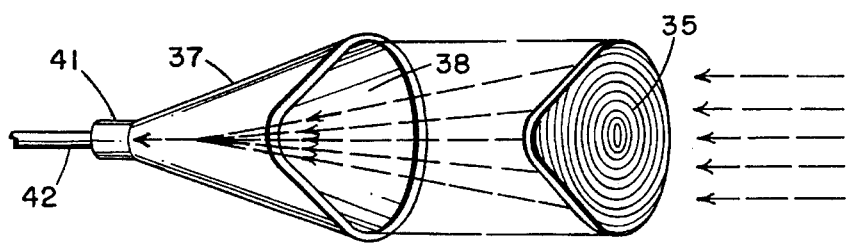
FIG. 1
FIG. 3
FIG. 2
FIG. 4

SOLAR SKYLIGHT APPARATUS

BACKGROUND OF THE INVENTION

The present invention relates to a skylight and especially to a skylight which can collect sunlight and disperse it within a building without penetrating the roof of the building and utilizes a solar energy collector transmitting light through flexible fiber optic cables to a light dispersion unit within a building.

In the past, it has been common to provide a wide variety of solar skylights which usually consist of a transparent polymer or glass covering of an opening in the roof of a building. This allows the light and solar energy to enter the building while keeping out the weather elements. A great deal of thought has gone into making the skylights weather-proof to prevent leaking around the edges of the opening in the roof by using various types of flashing and seals. In addition, prior skylights have generally been added to a building when the building is under construction since it is more difficult to add a skylight to an existing building. An existing building requires cutting an opening in the roof of the building and removing a portion of the roofing and thereby damages the integrity of the roof which may result in leaks and which can become points of entry by burglars. In addition to building the skylight through the roof, conventional skylights generally require the building of a passageway through the attic portion under the roof which increases the expense in the installation of the skylight.

Typical prior art skylights can be seen in the Bloxsom patent, U.S. Pat. No. 3,307,303, which shows a fireproof skylight assembly mounted on a frame with a raised wall over a short tunnel portion directing the solar energy through the roof of a building. In the Sutton patent, U.S. Pat. No. 5,099,622, a skylight is illustrated having an elongated tunnel which passes through the roof of a building and through the attic into a room in the building. The skylight or cover portion also includes a reflector for directing the light down the tunnel into the room. In the Greenwood patent, U.S. Pat. No. 5,175,967, is a natural light distributing apparatus having an elongated passageway from the skylight cover on a roof to a remote point within the building. The light from the skylight is reflected with a mirror set at a 45° angle to distribute the light perpendicular to the passageway. In the Gilowski patent, U.S. Pat. No. 5,027,566, a window with reflective enclosure illustrates a bay window mounted such that a portion protrudes over the roof for collecting sunlight and is reflecting down and through the window and also has an interior wall window with reflective surfaces to direct light down a light tunnel through another window. The Malissa patent, U.S. Pat. No. 3,521,414, shows a more typical skylight for a building but in which one embodiment includes a domed top for directing light into a building.

In two patents by Mori, et al., U.S. Pat. Nos. 4,928,666 and 4,915,093, containers for accommodating a solar ray collecting device are illustrated in which a skylight is mounted to a roof in a conventional fashion with an opening through the roof but which includes a solar collection unit connected to an optical conductor cable which is passed through the roof and through the skylight tunnel to transmit light within the building through the roof. In the Mori patent, U.S. Pat. No. 4,589,400, a solar ray collecting device uses a solar ray collection portion placed under a transparent cup for collecting solar energy and coupling the solar energy to optical fibers which are collected in a horizontal shaft and then fed down a vertical shaft through the building roof. The vertical shaft is such that it can be rotated with the optical fibers passing therethrough. This patent also has a motorized control for varying the angle of the solar collector.

In contrast to these prior art patents to Mori and Mori et al., the present invention, which also uses a solar collector, has mirrored funnel shaped collectors for coupling to the fiber optic cables which are fed out of the housing of the collector and along and through a building wall and thereby does not affect the integrity of the building roof. Also, the interior light dispersion unit is mounted in the building to a ceiling where it effectively disperses the light. The solar collector of the present invention can be placed on the ground or on the side of a building as well as on the roof of a building for providing light to the interior of the building. The present invention can even be relocated to illuminate other interior areas or other buildings.

SUMMARY OF THE INVENTION

A solar skylight is provided for collecting sunlight and dispersing the light within a building without the necessity for any roof penetrations of the building. The solar collector includes a base having a fixed portion and a rotatable portion and having a movable housing mounted to the rotatable portion of the base so that the solar collector housing can be rotated and moved up and down to aim the collector face towards the sun. A transparent cover that absorbs ultraviolet light and reflects infrared light is mounted over the front of the housing. A plurality of solar collectors are supported in a frame within the housing and aimed at the transparent cover for collecting solar energy passing therethrough. Each solar collector has a fresnel lens mounted on a mirrored, funnel shaped collector coupled to fiber optic cables for receiving the light collected by the solar collector. The fiber optic cables are combined into a bundle consisting of smaller bundled cables from each of the solar collectors and then passed through the collector housing and through a building transition for connection to a light dispersion unit. A light dispersion unit includes a light reflective interior built into the housing and a prismatic cover for dispersing light within a room in a building.

BRIEF DESCRIPTION OF THE DRAWINGS

Other objects, features, and advantages of the present invention will be apparent from the written description and the drawings in which:

FIG. 1 is a sectional view taken through a portion of a building having the solar collector and disperser of the present invention mounted thereto;

FIG. 2 is an exploded perspective view of the solar collector in accordance with the present invention;

FIG. 3 is an exploded perspective of the bundle of fiber optic cable formed at the end of each fresnel lens solar collector funnel; and FIG. 4 is an exploded perspective of one solar collector unit from the solar collector coupled to one fiber optic bundle.

DETAILED DESCRIPTION OF THE PREFERRED EMBODIMENT

Referring to the drawings FIGS. 1-4, a solar skylight 10 includes a solar collector unit 11 and a light dispersion unit 12 interconnected with bundles of fiber optic cables 13 mounted on a building 14. The collector 11 is mounted to the roof 15 of the building 14 while flexible fiber optic cable bundles 13 pass along the sidewalls 16 but could, of course, pass in the walls 16 and through the wall opening 17 into the light dispersion unit 12 which disperses light into the room 18 which can be one of the lower rooms in the building. The room can house furniture 20 positioned below the light deflector unit 12. The solar energy collection unit 11 has a housing 21 and a base 22. The base 22 has a fixed portion 23 and a rotatable portion 24 rotatably mounted to the base portion 23 similar to a turntable in which bearings 25 are mounted between the base fixed portion 23 and the rotatable portion 24. The base rotatable portion 24 has a shaft 26 mounted to the sides of the housing 21 so that the housing may rotate at an angular position relative to the base portion 24. A transparent cover 27 is mounted over an open end of the housing 21 for collecting the solar rays from the sun 30. The collected energy is fed to the fiber optic bundles 13 which is fed through the rear portion 31 of the solar collector housing 21. The energy is dispersed into the light dispersion unit 12 which has a reflector surface 32 therein as well as a prismatic lens cover 33 for dispersing the light being fed through the bundled fiber optic cables 13. The light dispersion unit 12 is mounted into a ceiling 34 of the building 14.

As seen in FIG. 2, the solar collector housing 21 mounted to the base 22 has the transparent cover 27 which absorbs most ultraviolet light rays and having an attached film or coating which reflects most infrared light rays, thus allowing mostly only visible light to pass through the transparent cover 27. Therefore in effect, most of the undesirable UV and IR light is prevented from passing through transparent cover 27. Each fresnel lens 35 is mounted on funnel-like shaped solar collector 37 having a mirrored surface 38 inside thereof, all of which are supported on inner housing frame 36. The energy from the sun is directed through the transparent cover 27 and into each of the fresnel lenses 35. Each fresnel lens 35 directs energy into the funnel collector 37, as shown in FIG. 4. The funnel collector 37 has a coupling 41 attaching fiber optic bundle 42 to the solar collector unit. Each fiber optic bundle 42 is composed of several fiber optic cables 40. These bundles from the funnel collectors 37 are then combined into a large fiber optic bundle 13 before exiting housing unit 21. FIG. 3 illustrates seven fiber optic cables 40 that fit into fiber optic bundle 42.

The large bundle of fiber optic cables 13 is a flexible bundle which can be fed out of the rear of the housing 21, as seen in FIG. 1, or through the middle of one of the shafts 26 where it can then be fed along the roof and along the wall of the building 14 and into the building at any desired point. The collector 11 can also be placed on the ground adjacent the building or on the side wall of the building and aimed toward the sun without departing from the spirit and scope of the invention. The solar skylight 10 can even be removed and relocated easily for other exterior areas or other buildings. In any location, the integrity of the roof 15 is not compromised since the cables are not fed through the roof but are fed through the walls. Advantageously, the present solar collection system can be mounted any where desired and connected through a window or through an opening in the wall and into any room in a multi-story building. The solar dispersion portion of the unit can be mounted as any conventional recessed lighting fixture.

The fiber optic bundles 13 can be plugged into existing illuminators under the correct circumstances. The entire solar collector unit 11 has universal movement for positioning the lens towards the sun 30 and can be manually readjusted for different times of the year or, alternatively, can be equipped with a small motor and solar sensor to automatically position the solar collecting unit 11 transparent cover 27 towards the sun continuously during the day.

It should be clear at this point that the present invention teaches a solar skylight having collection and dispersion units connected with fiber optic cable bundles which can be positioned in a wide variety of positions on or off of the roof of a building and connected to any room in a building. However, the present invention is not to be construed as limited to the forms shown which are to be considered illustrative rather than restrictive.

I claim:

1. A solar energy collector and dispersion unit for providing light into a building without passing through the roof of the building comprising:

a base;

a housing movably mounted with shafts to said base, said housing having an open front portion and a closed rear portion;

a transparent infrared blocking, ultraviolet absorbing cover mounted over said open front portion of said housing;

a plurality of funnel shaped solar collectors supported in said housing and each aimed at said transparent cover for collecting solar energy passing through said transparent cover, each said solar collector having a fresnel lens thereon for directing solar energy thereinto;

a plurality of fiber optic cables coupled to said solar collectors for receiving solar energy collected by said solar collectors, said plurality of fiber optic cables extending through said movable housing supporting shafts and extending into a building structure through the side wall of said building structure; and a light dispersion housing for mounting in a building and having said plurality of fiber optic cables extending thereinto for dispersion of the collected solar energy into said building, each said light dispersion housing having a light reflector therein and a prismatic cover thereover, whereby a solar skylight can be attached to a building without passing through the roof of a building.

2. A solar ray collector and dispersion unit for providing light to a building in accordance with claim 1 in which said plurality of fiber optic cables are bundled together.

3. A solar ray collector and dispersion unit for providing light to a building in accordance with claim 2 in which said base has a rotating housing support and means for rotating said housing support on a fixed base portion.

4. A solar energy collector and dispersion unit for providing light into a building without passing through the roof of the building comprising:

a base having a housing support including means for rotating said housing support on a fixed base portion;

a housing, means pivotally mounting said housing to said base housing support, said housing having an open front portion and a closed rear portion;

a visible light transparent cover mounted over said open front portion of said housing, said transparent cover having a material thereon to block infrared light from passing therethrough and said transparent cover being of a material which absorbs ultraviolet light;

a plurality of solar collectors supported in said housing and aimed at said transparent cover for collecting solar energy passing through said visible light transparent cover, each said solar collector unit being a funnel shaped collector having a reflective surface therein and each solar collection unit having a fresnel lens attached thereto to direct solar energy into the solar collector;

a plurality of fiber optic cables, each one being coupled to one of said solar collectors for receiving solar energy collected by said solar collector, said plurality of fiber optic cables extending through said movable housing and extending into a building structure through the side wall of said building structure; and a light dispersion housing for mounting in a building and having said plurality of fiber optic cables extending thereinto for dispersion of the collected solar energy into said building whereby a solar skylight can be attached to a building without passing through the roof of a building.

5. A solar ray collector and dispersion unit for providing light to a building in accordance with claim 4 in which said plurality of fiber optic cables are bundled together.

* * * * *